US010783191B1

(12) United States Patent
Caudy et al.

(10) Patent No.: US 10,783,191 B1
(45) Date of Patent: Sep. 22, 2020

(54) COMPUTER DATA DISTRIBUTION ARCHITECTURE FOR EFFICIENT DISTRIBUTION AND SYNCHRONIZATION OF PLOTTING PROCESSING AND DATA

(71) Applicant: Deephaven Data Labs LLC, Plymouth, MN (US)

(72) Inventors: Ryan Caudy, New York, NY (US); David R. Kent, IV, Colorado Springs, CO (US); Charles Wright, Cortlandt Manor, NY (US); Devon Patrick Allison, Colorado Springs, CO (US); Raffi Basralian, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 207 days.

(21) Appl. No.: 16/114,028

(22) Filed: Aug. 27, 2018

Related U.S. Application Data

(60) Provisional application No. 62/549,908, filed on Aug. 24, 2017.

(51) Int. Cl.
| | | |
|---|---|---|
| *G06F 17/00* | (2019.01) | |
| *G06F 16/9038* | (2019.01) | |
| *G06T 11/20* | (2006.01) | |
| *G06F 16/532* | (2019.01) | |
| *G06F 16/904* | (2019.01) | |
| *G06F 16/903* | (2019.01) | |

(52) U.S. Cl.
CPC ........ *G06F 16/9038* (2019.01); *G06F 16/532* (2019.01); *G06F 16/904* (2019.01); *G06F 16/90335* (2019.01); *G06T 11/206* (2013.01)

(58) Field of Classification Search
CPC .............. G06F 16/9038; G06F 16/532; G06F 16/90335; G06F 16/904; G06F 16/954; G06F 16/957; G06T 11/206
See application file for complete search history.

(56) References Cited

U.S. PATENT DOCUMENTS

| | | | |
|---|---|---|---|
| 5,335,202 | A | 8/1994 | Manning et al. |
| 5,452,434 | A | 9/1995 | Macdonald |
| 5,469,567 | A | 11/1995 | Okada |
| 5,504,885 | A | 4/1996 | Alashqur |
| 5,530,939 | A | 6/1996 | Mansfield et al. |
| 5,568,632 | A | 10/1996 | Nelson |
| 5,673,369 | A | 9/1997 | Kim |
| 5,701,461 | A | 12/1997 | Dalal et al. |
| 5,701,467 | A | 12/1997 | Freeston |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

Final Office Action dated May 4, 2017, in U.S. Appl. No. 15/155,009.

(Continued)

*Primary Examiner* — Greta L Robinson
(74) *Attorney, Agent, or Firm* — Carmichael IP, PLLC

(57) ABSTRACT

Described are methods, systems and computer readable media for computer data distribution architecture for efficient distribution and synchronization of plotting processing and data.

30 Claims, 10 Drawing Sheets

(56) References Cited

U.S. PATENT DOCUMENTS

| | | |
|---|---|---|
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A | 12/2000 | Lea et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B2 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,523,462 B1* | 4/2009 | Nesamoney ........ G06F 16/2458 719/318 |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |

(56) References Cited

U.S. PATENT DOCUMENTS

| | | |
|---|---|---|
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo'et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Acuña et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent I et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 * | 6/2017 | Wright ............... G06F 16/2379 |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 * | 10/2017 | Wright ............... G06F 3/0481 |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent I et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent I et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0116287 A1 | 5/2007 | Rasizade et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |

(56) References Cited

U.S. PATENT DOCUMENTS

| | | |
|---|---|---|
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1* | 6/2009 | De Peuter .............. G06Q 10/10 |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Daily |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodoresou et al. |
| 2016/0335361 A1 | 11/2016 | Teodoresou et al. |
| 2017/0161514 A1 | 6/2017 | Dettinger et al. |
| 2017/0177677 A1 | 6/2017 | Wright et al. |
| 2017/0185385 A1 | 6/2017 | Kent I et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |

(56) References Cited

U.S. PATENT DOCUMENTS

| | | | |
|---|---|---|---|
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0359415 A1 | 12/2017 | Venkatraman et al. |
| 2018/0004796 A1 | 1/2018 | Kent I et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | | |
|---|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

Gal, Lei et al. "An Efficient Summary Graph Driven Method for RDF Query Processing", dated Oct. 27, 2015. Retreived from http://arxiv.org/pdf/1510.07749.pdf.

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

International Search Report and Written Opinion dated Aug. 18, 2016, in International Appln. No. PCT/US2016/032599 filed May 14, 2016.

International Search Report and Written Opinion dated Aug. 18, 2016, in International Appln. No. PCT/US2016/032605 filed May 14, 2016.

International Search Report and Written Opinion dated Aug. 25, 2016, in International Appln. No. PCT/US2016/032590 filed May 14, 2016.

International Search Report and Written Opinion dated Aug. 25, 2016, in International Appln. No. PCT/US2016/032592 filed May 14, 2016.

International Search Report and Written Opinion dated Aug. 4, 2016, in International Appln. No. PCT/US2016/032581 filed May 14, 2016.

International Search Report and Written Opinion dated Jul. 28, 2016, in International Appln. No. PCT/US2016/032586 filed May 14, 2016.

International Search Report and Written Opinion dated Jul. 28, 2016, in International Appln. No. PCT/US2016/032587 filed May 14, 2016.

International Search Report and Written Opinion dated Jul. 28, 2016, in International Appln. No. PCT/US2016/032589 filed May 14, 2016.

International Search Report and Written Opinion dated Sep. 1, 2016, in International Appln. No. PCT/US2016/032596 filed May 14, 2016.

International Search Report and Written Opinion dated Sep. 1, 2016, in International Appln. No. PCT/US2016/032598 filed May 14, 2016.

International Search Report and Written Opinion dated Sep. 1, 2016, in International Appln. No. PCT/US2016/032601 filed May 14, 2016.

International Search Report and Written Opinion dated Sep. 1, 2016, in International Appln. No. PCT/US2016/032602 filed May 14, 2016.

International Search Report and Written Opinion dated Sep. 1, 2016, in International Appln. No. PCT/US2016/032607 filed May 14, 2016.

International Search Report and Written Opinion dated Sep. 15, 2016, in International Appln. No. PCT/US2016/032591 filed May 14, 2016.

International Search Report and Written Opinion dated Sep. 15, 2016, in International Appln. No. PCT/US2016/032594 filed May 14, 2016.

International Search Report and Written Opinion dated Sep. 15, 2016, in International Appln. No. PCT/US2016/032600 filed May 14, 2016.

International Search Report and Written Opinion dated Sep. 29, 2016, in International Appln. No. PCT/US2016/032595 filed May 14, 2016.

International Search Report and Written Opinion dated Sep. 29, 2016, in International Appln. No. PCT/US2016/032606 filed May 14, 2016.

International Search Report and Written Opinion dated Sep. 8, 2016, in International Appln. No. PCT/US2016/032603 filed May 14, 2016.

International Search Report and Written Opinion dated Sep. 8, 2016, in International Appln. No. PCT/US2016/032604 filed May 14, 2016.

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Kramer, The Combining DAG: A Technique for Parallel Data Flow Analysis, IEEE Transactions on Parallel and Distributed Systems, vol. 5, No. 8, Aug. 1994, pp. 805-813.

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Mallet, "Relational Database Support for Spatio-Temporal Data", Technical Report TR 04-21, Sep. 2004, University of Alberta, Department of Computing Science.

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Murray, Derek G. et al. "Naiad: a timely dataflow system." SOSP '13 Proceedings of the Twenty-Fourth ACM Symposium on Operating Systems Principles. pp. 439-455. Nov. 2013.

Non-final Office Action dated Apr. 12, 2018, in U.S. Appl. No. 15/154,997.

Non-final Office Action dated Apr. 19, 2017, in U.S. Appl. No. 15/154,974.

Non-final Office Action dated Apr. 23, 2018, in U.S. Appl. No. 15/813,127.

Non-final Office Action dated Apr. 5, 2018, in U.S. Appl. No. 15/154,984.

Non-final Office Action dated Aug. 10, 2018, in U.S. Appl. No. 16/004,578.

Non-final Office Action dated Aug. 12, 2016, in U.S. Appl. No. 15/155,001.

Non-final Office Action dated Aug. 16, 2016, in U.S. Appl. No. 15/154,993.

Non-final Office Action dated Aug. 19, 2016, in U.S. Appl. No. 15/154,991.

Non-final Office Action dated Aug. 25, 2016, in U.S. Appl. No. 15/154,980.

(56) References Cited

OTHER PUBLICATIONS

Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Feb. 8, 2017, in U.S. Appl. No. 15/154,997.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Jun. 29, 2018, in U.S. Appl. No. 15/154,974.
Non-final Office Action dated Jun. 8, 2018, in U.S. Appl. No. 15/452,574.
Non-final Office Action dated Mar. 2, 2017, in U.S. Appl. No. 15/154,984.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Apr. 30, 2018, in U.S. Appl. No. 15/155,012.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 12, 2018, in U.S. Appl. No. 15/813,142.
Notice of Allowance dated Feb. 14, 2017, in U.S. Appl. No. 15/154,979.
Notice of Allowance dated Feb. 26, 2018, in U.S. Appl. No. 15/428,145.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 11, 2018, in U.S. Appl. No. 15/154,995.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated May 4, 2018, in U.S. Appl. No. 15/897,547.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Notice of Allowance dated Sep. 11, 2018, in U.S. Appl. No. 15/608,963.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering

(56) References Cited

OTHER PUBLICATIONS (ICDE 2015), Seoul, Korea, Apr. 13-17, 2015. Retreived from http://imada.sdu.dk~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retreived from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/ http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Tracking Data Changes", SQL Server 2008 R2, dated Sep. 22, 2015. Retrieved from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Borror, Jefferey A. "Q for Mortals 2.0", dated Nov. 1, 2011. Retreived from http://code.kx.com/wiki/JB:QforMortals2/contents.
Breitbart, Update Propagation Protocols for Replicated Databases, SIGMOD '99 Philadelphia PA, 1999, pp. 97-108.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Ex Parte Quayle Action mailed Aug. 8, 2016, in U.S. Appl. No. 15/154,999.
Final Office Action dated Apr. 10, 2017, in U.S. Appl. No. 15/155,006.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 19, 2016, in U.S. Appl. No. 15/154,995.
Final Office Action dated Dec. 29, 2017, in U.S. Appl. No. 15/154,974.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 18, 2018, in U.S. Appl. No. 15/155,005.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 18, 2018, in U.S. Appl. No. 15/654,461.

* cited by examiner

```
A = db.tableA;                                          600
B = db.tableB;
X = A.someOperation();
Y = B.someOperation();
myPlot = plot(0, X, "Col1", "Col2");
myPlot = myPlot.plot(1, X, "Col1", "Col3");
myPlot = myPlot.plot(2, Y, "Col1", "Col2");
myPlot = myPlot.show();
```
FIG. 6A
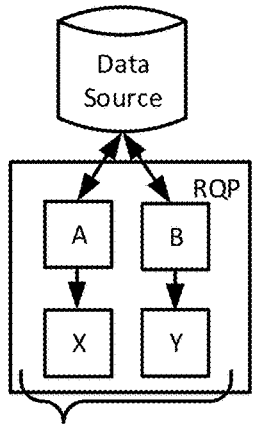
FIG. 6B
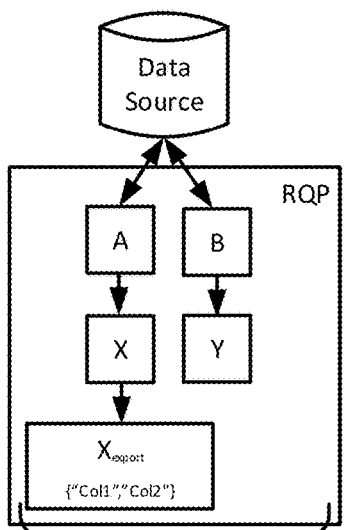
FIG. 6C
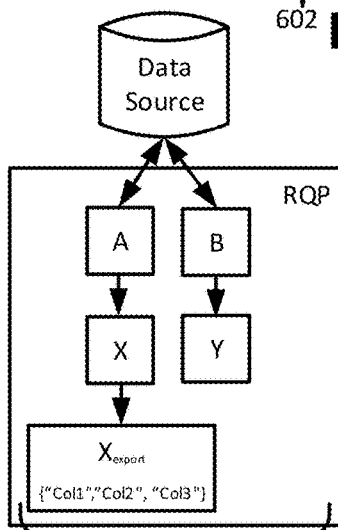
FIG. 6D
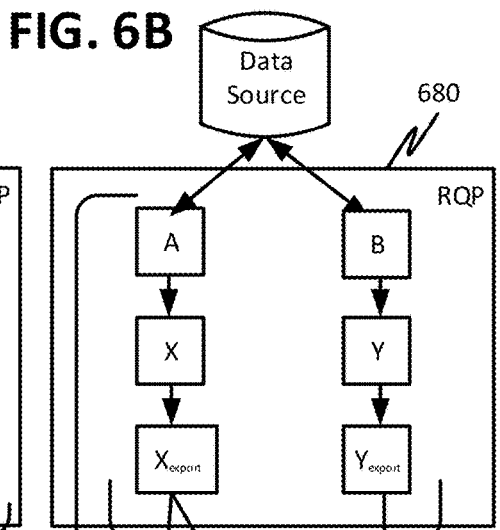
FIG. 6E
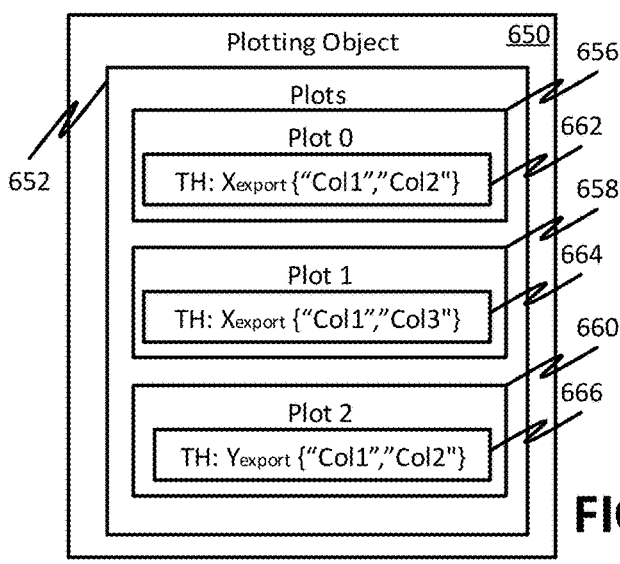
FIG. 6F

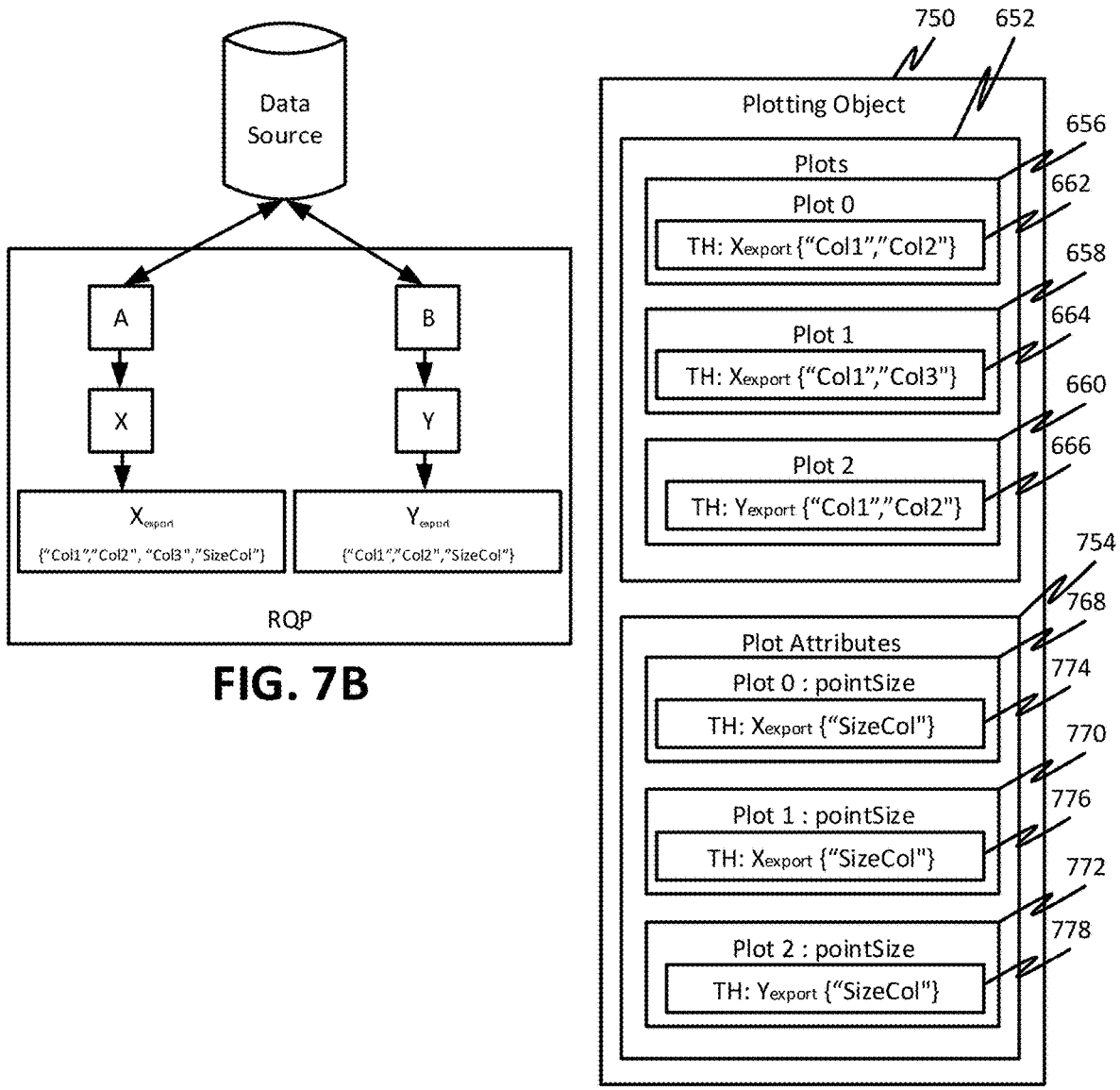

```
t = db.t("LearnData","StockTrades")                    800
    .where("Date=`2017-08-21`")
    .where("USym in `AAA`,`BBB`,`CCC`,`DDD`,`EEE`,`FFF`")
toc = oneClick(t, "USym")
RetailPlot = plot("USym", toc, "Timestamp", "Last").show()
```
FIG. 8A
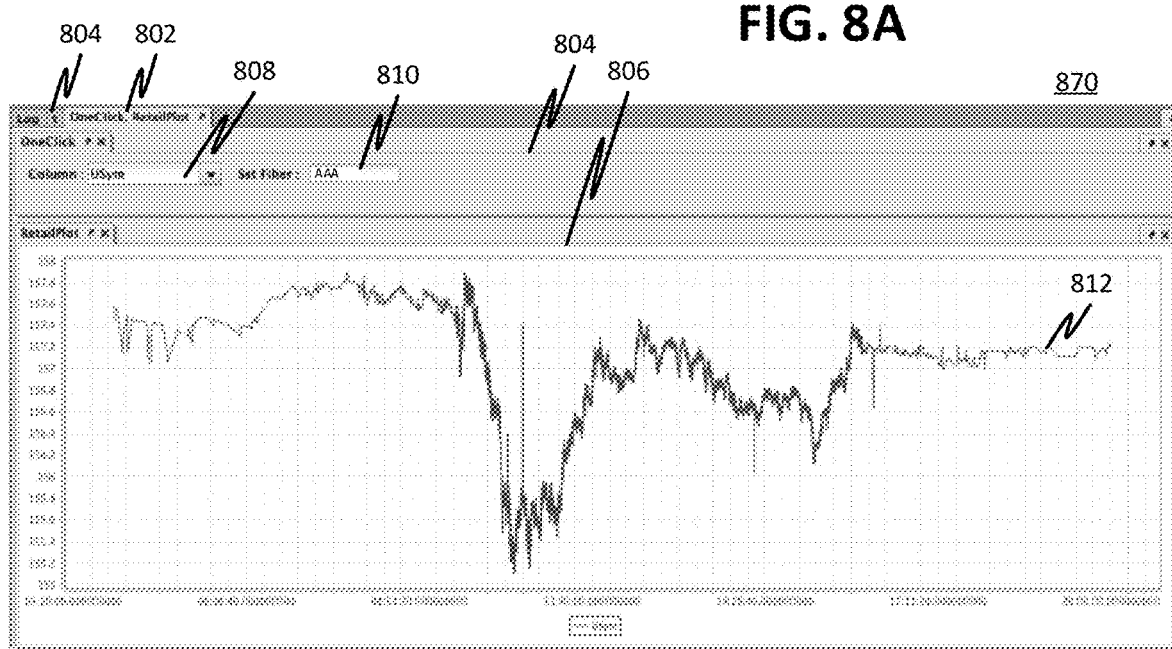
FIG. 8B
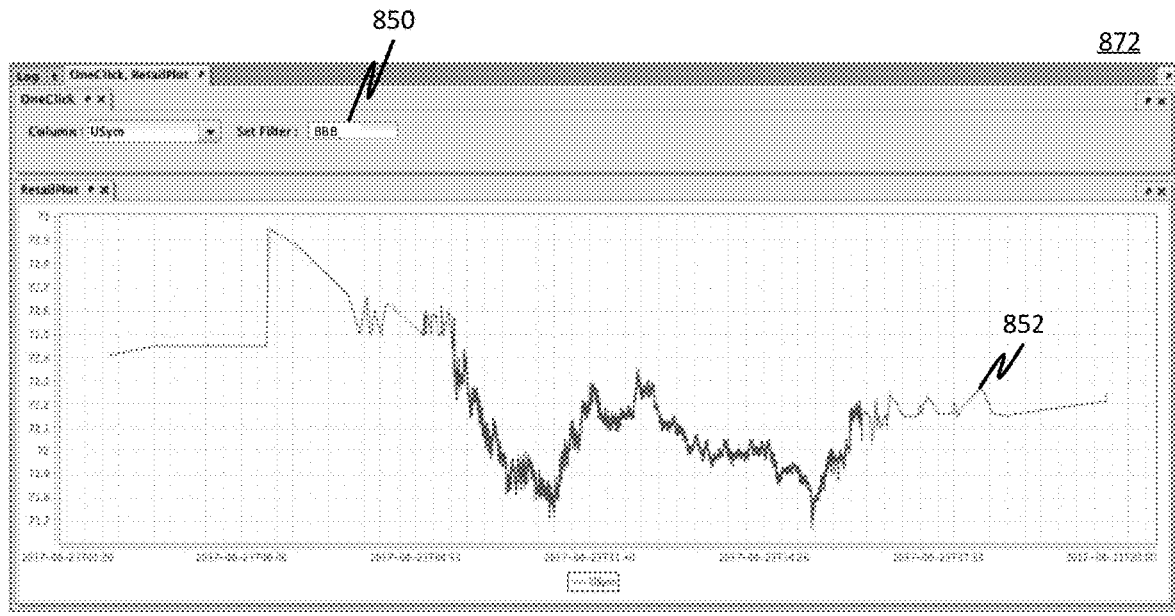
FIG. 8C

COMPUTER DATA DISTRIBUTION ARCHITECTURE FOR EFFICIENT DISTRIBUTION AND SYNCHRONIZATION OF PLOTTING PROCESSING AND DATA

This application claims the benefit of U.S. Provisional Application No. 62/549,908, entitled "COMPUTER DATA SYSTEM" and filed on Aug. 24, 2017, which is incorporated herein by reference in its entirety.

Embodiments relate generally to computer data systems, and more particularly, to methods, systems and computer readable media for computer data distribution architecture for efficient plotting data synchronization using remote query processors.

Some conventional computer data systems may maintain data in one or more data sources that may include data objects such as tables. These conventional systems may include clients that access tables from each data source to create visualizations of the data. In such data systems, a need may exist to provide systems and methods for efficient synchronization of dynamically changing plotting data, in order to reduce memory usage of an individual client and to enable redundancy, high-availability, scalability, and allow parallelization of plotting processing across multiple clients. In such data systems, a need may also exist to enable local modification of plots without having to contact a server in order to provide more responsive user interactions and to minimize communications with the server.

Embodiments were conceived in light of the above mentioned needs, problems and/or limitations, among other things.

Some implementations (first implementations) include a computer database system, one or more processors, and computer readable storage coupled to the one or more processors. The computer readable storage can have stored thereon instructions that, when executed by the one or more processors, cause the one or more processors to perform operations. The operations can include receiving, at a remote query processor, a plot command to generate a plot at a client computer, the plot command referencing a first object, the first object being updatable by propagating updates through an update propagation graph associated with the first object. The operations can include generating, at the remote query processor, a plotting data structure comprising an export object handle referencing at least a portion of the first object. The operations can include transmitting, at the remote query processor, one or more messages to the client computer, the one or more messages comprising the plotting data structure and an initial snapshot of the first object. The operations can include automatically subscribing, at the remote query processor, the client computer to receive consistent updates to the first object. The operations can include receiving, at the client computer, the one or more messages comprising the plotting data structure and the initial snapshot from the remote query processor. The operations can include creating, at the client computer, a second object to represent a replica of the portion of the first object referenced by the export object handle. The operations can include storing, at the client computer, the initial snapshot as the replica of the portion of the first object referenced by the export object handle. The operations can include assigning, at the client computer, the replica as an input to a figure to be displayed in a graphical user interface. The operations can include generating, at the client computer, a graphical figure comprising the plot based on the plotting data structure and the replica of the portion of the first object referenced by the export object handle. The operations can include adding at the remote query processor a first listener to the update propagation graph as a dependent of the first object. The operations can include receiving, at the first listener, an update notification indicating an update to the first object. The operations can include sending, by the remote query processor, a notification to the client computer including an indication of the change to the first object and a copy of any changed data. The operations can include, responsive to receiving the notification at the client computer, updating the replica of the portion of the first object referenced by the export object handle. The operations can include updating, at the client computer, the graphical figure comprising the plot based on the plotting data structure and the updated replica of the portion of the first object referenced by the export object handle.

In some first implementations, the plotting data structure comprises the initial snapshot. In some first implementations, the operations can further include: receiving, at the client computer, a request for the graphical figure from a remote computer; and transmitting, at the client computer, the graphical figure in an image format to the remote computer. In some first implementations, the image format is selected from a group consisting of JPEG, GIF, PNG, SVG, and PDF. In some first implementations, the updating the graphical figure is performed after at least a portion of the graphical figure is visible in the graphical user interface. In some first implementations, the updating the graphical figure is throttled such that the updating is performed as part of a batch update. In some first implementations, the plotting data structure comprises a second export object handle referencing a second object to define an attribute of the plot. In some first implementations, the first object is a table and the export object handle is an export table handle. In some first implementations, the operations further include determining that the graphical figure is not being displayed by the client computer, and, responsive to the determining that the graphical figure is not being displayed, setting a mode of the plot to a sleep mode. In some first implementations, the sleep mode ignores or prevents redraw events for the plot.

Some implementations (second implementations) include a method that can include receiving, at a remote query processor, a plot command to generate a plot at a client computer, the plot command referencing a first object, the first object being updatable by propagating updates through an update propagation graph associated with the first object. The method can include generating, at the remote query processor, a plotting data structure comprising an export object handle referencing at least a portion of the first object. The method can include transmitting, at the remote query processor, one or more messages to the client computer, the one or more messages comprising the plotting data structure and an initial snapshot of the first object. The method can include receiving, at the client computer, the one or more messages comprising the plotting data structure and the initial snapshot from the remote query processor. The method can include creating, at the client computer, a second object to represent a replica of the portion of the first object referenced by the export object handle. The method can include storing, at the client computer, the initial snapshot as the replica of the portion of the first object referenced by the export object handle. The method can include assigning, at the client computer, the replica as an input to a figure to be displayed in a graphical user interface. The method can include generating, at the client computer, a graphical figure comprising the plot based on the plotting data structure and the replica of the portion of the first object referenced by the export object handle. The method can include adding at the remote query processor a first listener to the update propagation graph as a dependent of the first object. The method can include receiving, at the first listener, an update notification indicating an update to the first object. The method can include sending, by the remote query processor, a notification to the client computer including an indication of the change to the first object and a copy of any changed data. The method can include, responsive to receiving the notification at the client computer, updating the replica of the portion of the first object referenced by the export object handle. The method can include updating, at the client computer, the graphical figure comprising the plot based on the plotting data structure and the updated replica of the portion of the first object referenced by the export object handle.

In some second implementations, the plotting data structure comprises the initial snapshot. In some second implementations, the method can further include: receiving, at the client computer, a request for the graphical figure from a remote computer; and transmitting, at the client computer, the graphical figure in an image format to the remote computer. In some second implementations, the image format is selected from a group consisting of JPEG, GIF, PNG, SVG, and PDF. In some second implementations, the updating the graphical figure is performed after at least a portion of the graphical figure is visible in the graphical user interface. In some second implementations, the updating the graphical figure is throttled such that the updating is performed as part of a batch update. In some second implementations, the plotting data structure comprises a second export object handle referencing a second object to define an attribute of the plot. In some second implementations, the method further comprising automatically subscribing, at the remote query processor, the client computer to receive consistent updates to the first object. In some second implementations, the first object is a table and the export object handle is an export table handle. In some second implementations, the method further includes determining that the graphical figure is not being displayed by the client computer, and responsive to the determining that the graphical figure is not being displayed, setting a mode of the plot to a sleep mode. In some second implementations, the sleep mode stops updates to the first object from being received.

Some implementations (third implementations) include a nontransitory computer readable medium having stored thereon software instructions that, when executed by one or more processors, cause the one or more processors to perform operations. The operations can include receiving, at a remote query processor, a plot command to generate a plot at a client computer, the plot command referencing a first object, the first object being updatable by propagating updates through an update propagation graph associated with the first object. The operations can include generating, at the remote query processor, a plotting data structure comprising an export object handle referencing at least a portion of the first object. The operations can include transmitting, at the remote query processor, one or more messages to the client computer, the one or more messages comprising the plotting data structure and an initial snapshot of the first object. The operations can include receiving, at the client computer, the one or more messages comprising the plotting data structure and the initial snapshot from the remote query processor. The operations can include creating, at the client computer, a second object to represent a replica of the portion of the first object referenced by the export object handle. The operations can include storing, at the client computer, the initial snapshot as the replica of the portion of the first object referenced by the export object handle. The operations can include assigning, at the client computer, the replica as an input to a figure to be displayed in a graphical user interface. The operations can include generating, at the client computer, a graphical figure comprising the plot based on the plotting data structure and the replica of the portion of the first object referenced by the export object handle. The operations can include adding at the remote query processor a first listener to the update propagation graph as a dependent of the first object. The operations can include receiving, at the first listener, an update notification indicating an update to the first object. The operations can include sending, by the remote query processor, a notification to the client computer including an indication of the change to the first object and a copy of any changed data. The operations can include, responsive to receiving the notification at the client computer, updating the replica of the portion of the first object referenced by the export object handle. The operations can include updating, at the client computer, the graphical figure comprising the plot based on the plotting data structure and the updated replica of the portion of the first object referenced by the export object handle.

In some third implementations, the plotting data structure comprises the initial snapshot. In some third implementations, the operations also include receiving, at the client computer, a request for the graphical figure from a remote computer, and, transmitting, at the client computer, the graphical figure in an image format to the remote computer in response to the request from the remote computer. In some third implementations, the updating the graphical figure is performed only when at least a portion of the graphical figure is visible in the graphical user interface. In some third implementations, the updating the graphical figure is throttled such that the updating is performed as part of a batch update. In some third implementations, the plotting data structure comprises a second export object handle referencing a second object to define an attribute of the plot. In some third implementations, the operations also include automatically subscribing, at the remote query processor, the client computer to receive consistent updates to the first object. In some third implementations, the first object is a table and the export object handle is an export table handle. In some third implementations, the operations also include determining that the graphical figure is not being displayed by the client computer, and, responsive to the determining that the graphical figure is not being displayed, setting a mode of the plot to a sleep mode.

BRIEF DESCRIPTION OF THE DRAWINGS

FIGS. 6A-F show data source definitions, directed acyclic graphs (DAG), and a plotting object in accordance with some implementations.

FIGS. 7A-7C show plotting code including data source definitions, a directed acyclic graph (DAG), and a plotting object in accordance with some implementations.

FIGS. 8A-8C show plotting code and graphical user interfaces (GUIs) in accordance with some implementations.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
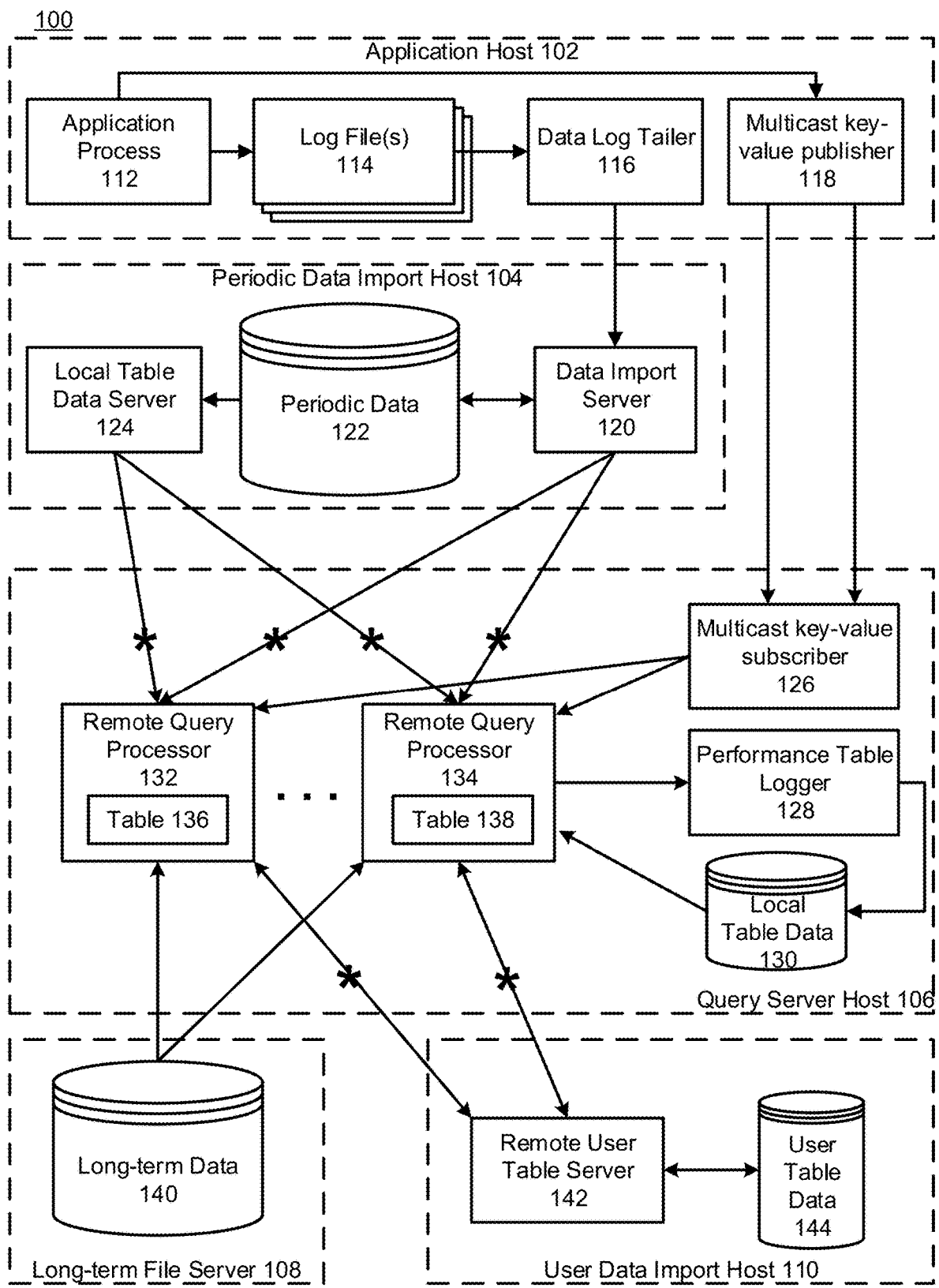
FIG. 1 is a diagram of an example computer data system showing an example data distribution configuration, in accordance with some implementations.
Figure 2:
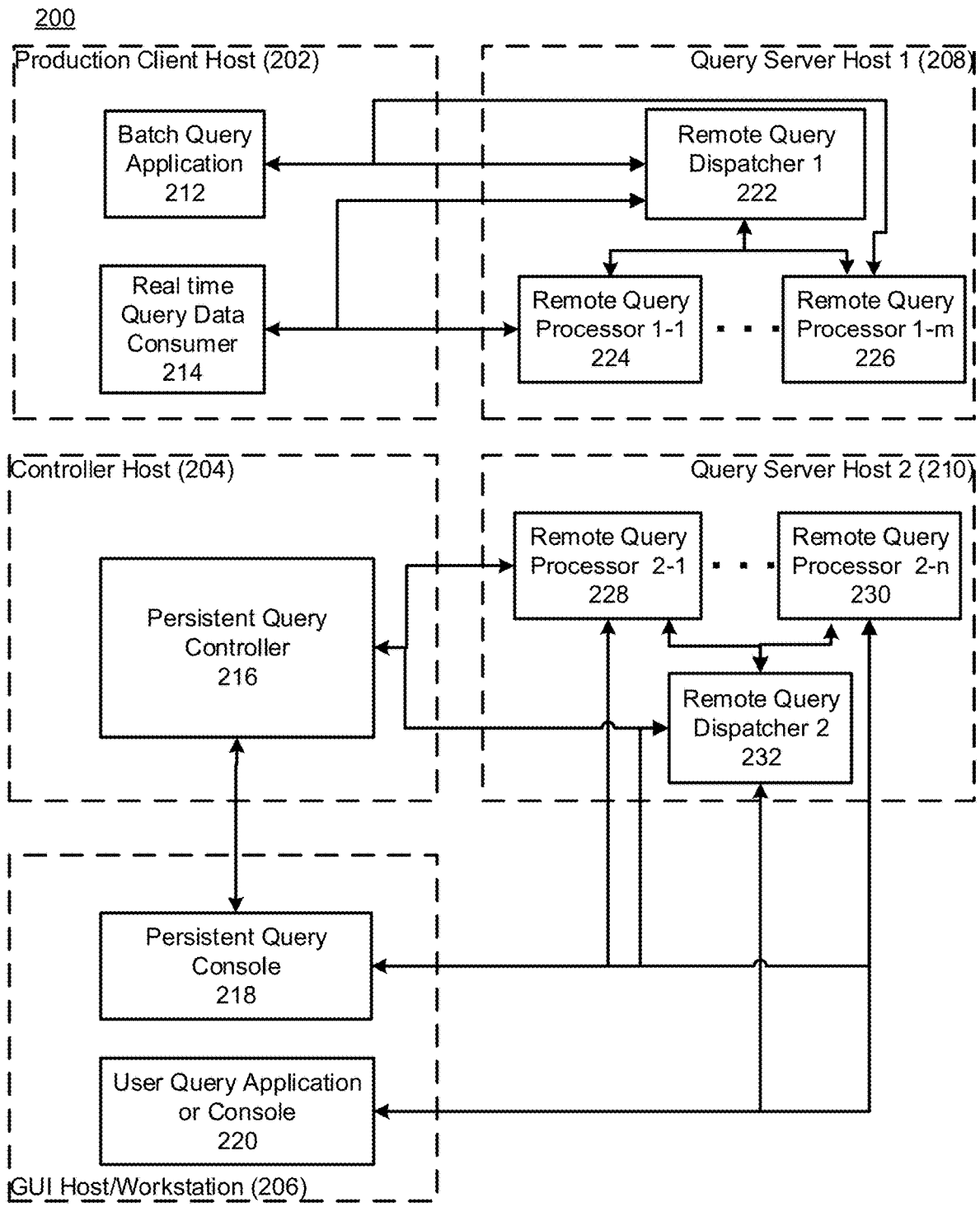
FIG. 2 is a diagram of an example computer data system showing an example administration/process control arrangement, in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. Consistent data can also include a view of the data that is internally consistent for a given instant (e.g. a consistent data snapshot at a given instant). If data is presented to clients, such as a remote query processor (132, 134), then the data may be persisted in some fashion (e.g., written to disk).

Figure 3:
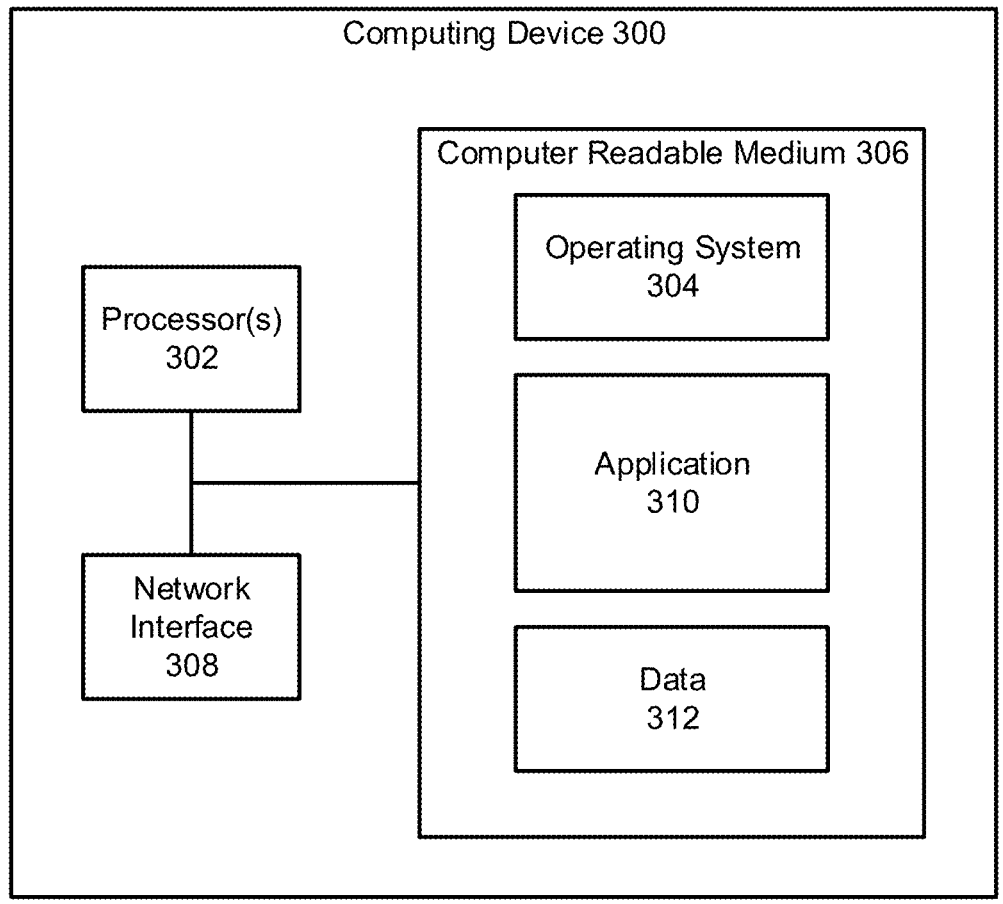
FIG. 3 is a diagram of an example computing device configured for efficient distribution and synchronization of plotting processing and data, in accordance with at least one implementation.
Figure 4:
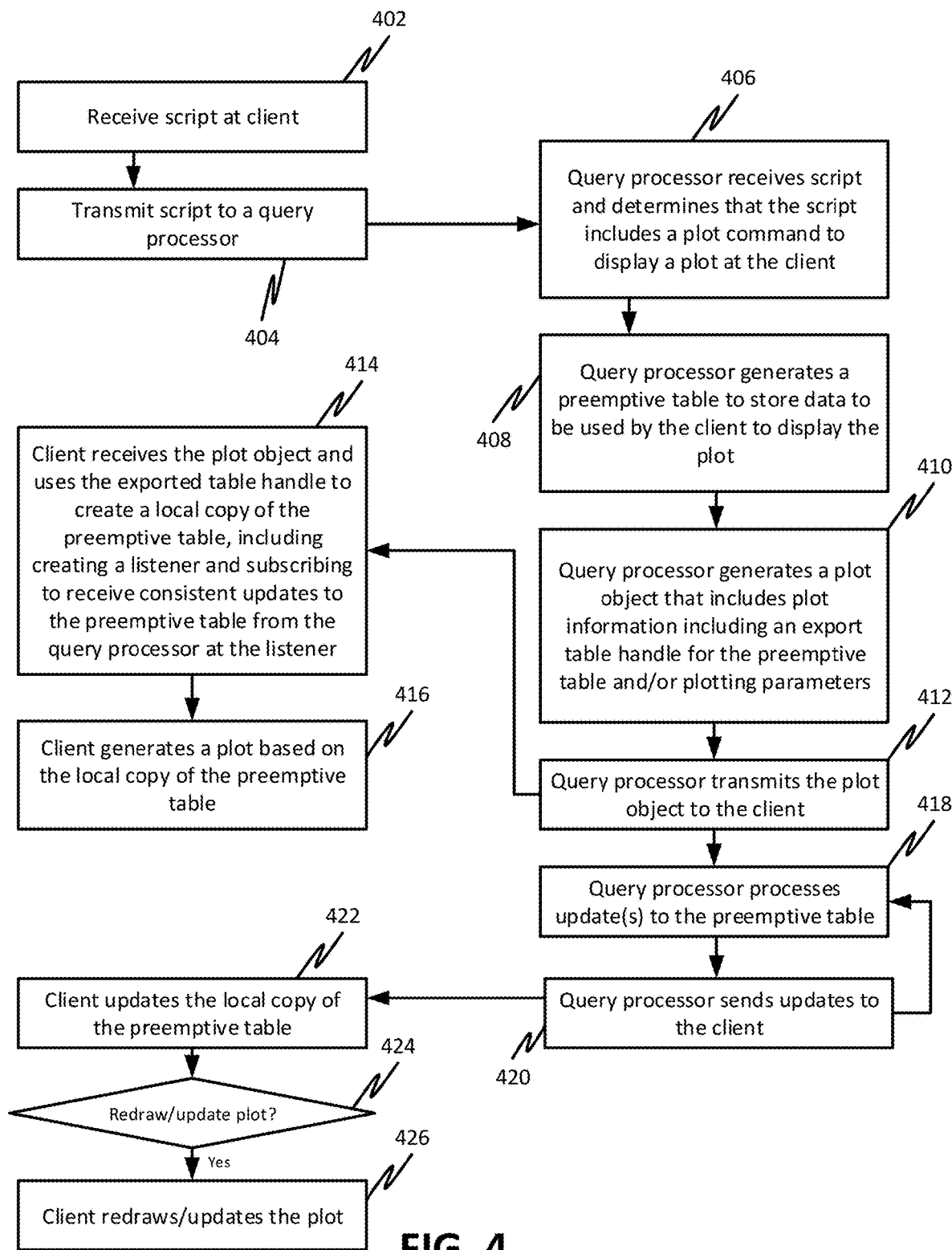
FIG. 4 is a flowchart of an example method of efficient distribution and synchronization of plotting processing and data in accordance with some implementations.

The local table data server 124 can be configured to retrieve data stored in the periodic table data store 122 and provide the retrieved data to one or more remote query processors (132, 134) via an optional proxy (e.g., table data cache proxy (TDCP) 394 and/or 404 as shown in FIG. 3 and FIG. 4, respectively). Remote query processors (132, 134) can also receive data from DIS 120 and/or LTDS 124 via the proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors (e.g., table data cache proxy (TDCP) 392 or 404 as shown in FIG. 3B and FIG. 4, respectively). Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or scheduled (e.g., cron jobs). Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

FIG. 3 is a diagram of an example computing device 300 configured for efficient distribution and synchronization of plotting processing and data in accordance with at least one implementation. The computing device 300 includes one or more processors 302, operating system 304, computer readable medium 306 and network interface 308. The memory 306 can include connected application 310 and a data section 312 (e.g., for storing caches, index data structures, column source maps, plotting object 650, plotting object 750, etc.).

In operation, the processor 302 may execute the application 310 stored in the memory 306. The application 310 can include software instructions that, when executed by the processor, cause the processor to perform operations for efficient distribution and synchronization of plotting processing and data in accordance with the present disclosure (e.g., performing one or more of 402-426, 502-526, and/or 902-922 described below).

The application program 310 can operate in conjunction with the data section 312 and the operating system 304.

FIG. 4 is a flowchart of an example method 400 of efficient distribution and synchronization of plotting processing and data in accordance with some implementations. Processing begins at 402, where a client receives a script. For example, the client can receive a script entered by a user that includes plot commands such as, for example, a script like that shown in FIG. 6A. Processing continues to 404.

At 404, the client transmits the script to a query processor. The client and query processor can be running on the same or different hardware. For example, the client can transmit the script to a query processor remote from the client. In another example, the client and query processor could be running on the same hardware. Processing continues to 406.

At 406, the query processor received the script and determines that the script includes a plot command to display a plot at the client. Processing continues to 408.

At 408, the query processor generates a preemptive table to store data to be used by the client to display the plot. In some embodiments, more than one preemptive table can be used to display a plot as shown, for example, in FIG. 6E. Processing continues to 410.

At 410, the query processor generates a plot object that includes plot information including an export table handle for the preemptive table and/or plotting parameters. Processing continues to 412.

At 412, the query processor transmits the plot object to the client. Processing continues to 414 and/or 418.

At 414, the client receives the plot object and uses the exported table handle to create a local copy of the preemptive table, including creating a listener and subscribing to receive consistent updates to the preemptive table from the query processor at the listener. In some embodiments, the client receiving the plot object can be different than the client at 402 and 404 (e.g., a first client can configure a plot that a second client can retrieve) (e.g., a client can connect to a persistent query, receive a list of available plots already available for that persistent query, and receive a plot object for one or more of the plots already available for that the persistent query). Processing continues to 416.

At 416, the client generates a plot based on the local copy of the preemptive table. In some embodiments, the client can generate an image of the plot and store the image of the plot. In some such embodiments, the image can be stored for distribution via a network such as a public network (e.g., the Internet) or a private network (e.g., an intranet).

At 418, the query processor processes update(s) to the preemptive table. Processing continues to 420.

At 420, the query processor sends updates to the client. Processing continues to 422.

At 422, the client updates the local copy of the preemptive table. Processing continues to 424.

At 424, the client determines whether the plot generated at 416 should be redrawn/updated. If so, processing continues 426.

At 426, the client redraws/updates the plot. In some embodiments the client can create/redraw/update the plot using an appropriate framework such as, for example, JFreeChart by Object Refinery Limited, Orson Charts by Object Refinery Limited, and/or Highcharts by Highsoft.

It will be appreciated that, although not shown, the subscribing client can cancel their subscription to stop receiving updates from the query processor, and that the TDCP may cancel its own data subscriptions and/or discard data it no longer needs for any RQP. It will also be appreciated that, although not shown, the subscribing client can cancel or pause updates when a plot is not "in view" in a graphical user interface (GUI) of the client (e.g., the plot is in a tab or window that is not active and/or not in the foreground or some other GUI element is preventing the plot from being displayed it the GUI) to reduce network traffic and reduce client replotting/redrawing processing (and can resume/restart updates when the plot is again viewable in the GUI).

It will also be appreciated that 402-422 may be repeated in whole or in part. For example, 418-420 may be repeated to provide the synchronized client with consistent updates to the preemptive table.

In some embodiments, a client can connect to an existing persistent query and the persistent query can provide a list of plots, tables, and other widgets that can be displayed. In such embodiments, 402-406 do not need to be performed and the client can select a widget from the list associated with the persistent query and info on the selected widget can be sent to the client, and the widget can be drawn.

Figure 5:
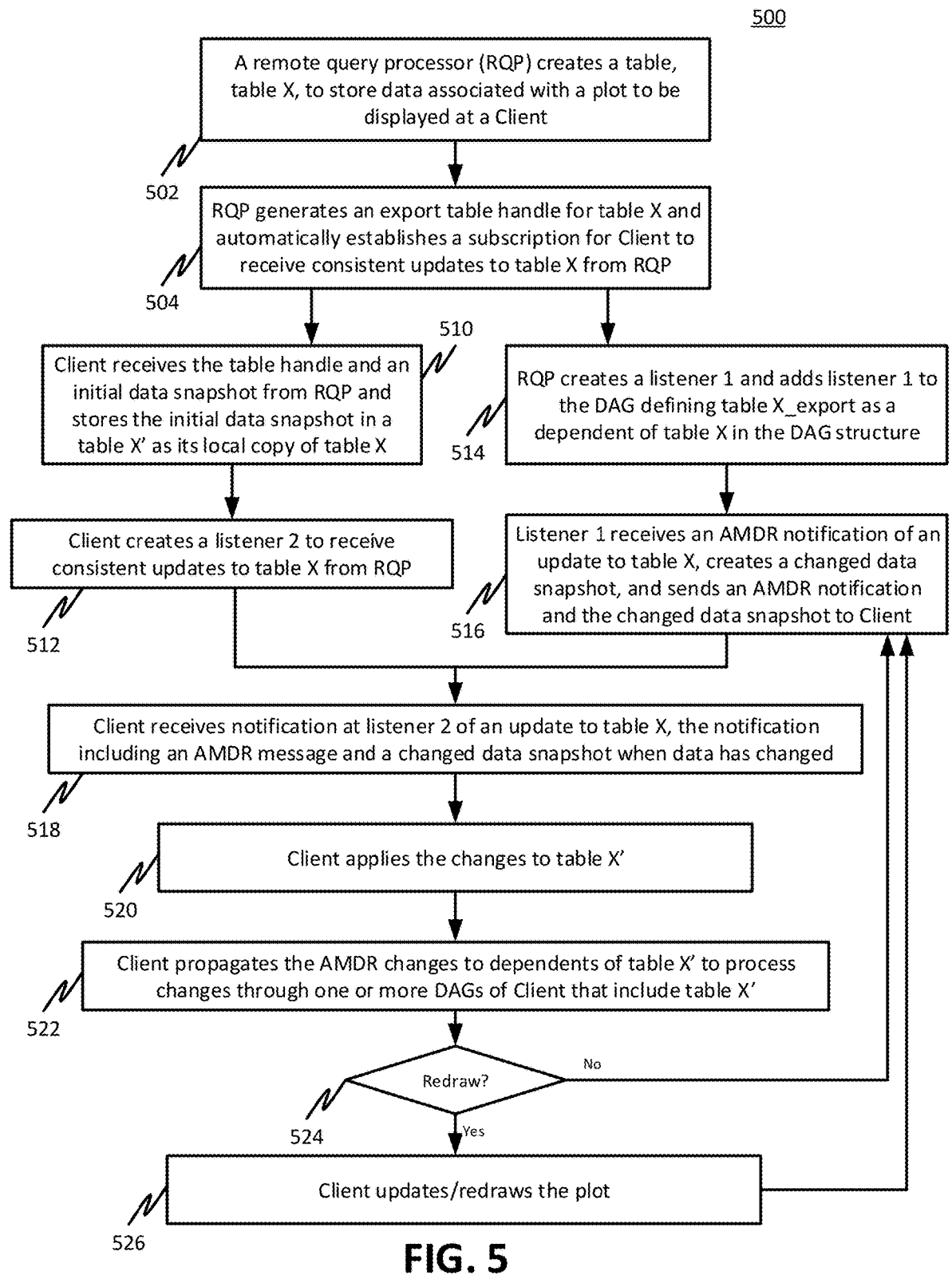
FIG. 5 is a flowchart of an example method of efficient distribution and synchronization of plotting processing and data in accordance with some implementations.

FIG. 5 is a flowchart of an example method 500 of efficient distribution and synchronization of plotting processing and data in accordance with some implementations. Processing begins at 502, where a remote query processor (RQP) creates a table, table X, to store data associated with a plot to be displayed by a client. For example, table X can be created as the result of an operation on table A, as shown in FIG. 6A. Processing continues to 504.

At 504, RQP generates an export table handle for table X and automatically establishes a subscription for Client to receive consistent updates to table X from RQP. Processing continues to 510 and/or 514.

At 510, Client receives the table handle and an initial data snapshot from RQP and stores the initial data snapshot in a table X' (e.g., table X' in FIG. 6D) as its local copy of table X. In some embodiments, RQP can create the data snapshot for transmission to Client using method 1000 shown in FIG. 10 of U.S. patent application Ser. No. 15/813,127, entitled "COMPUTER DATA DISTRIBUTION ARCHITECTURE CONNECTING AN UPDATE PROPAGATION GRAPH THROUGH MULTIPLE REMOTE QUERY PROCESSORS" and filed on Nov. 14, 2017 (hereinafter the '127 application), which is hereby incorporated by reference herein in its entirety as if fully set forth herein. Processing continues to 512.

At 512, Client creates a listener 2 to receive consistent updates to table X from RQP (e.g., although not shown, X' in FIG. 6D can include a listener such as listener 2). Processing continues to 418.

At 514, worker 1 creates a listener 1 and adds listener 1 to the DAG defining table X_export as a dependent of table X in the DAG structure (e.g., although not shown, X_export in FIG. 5C can include a listener such as listener 1). Processing continues to 516.

At 516, listener 1 receives an AMDR notification of an update to table X, creates a changed data snapshot, and sends an AMDR notification and the changed data snapshot to worker 2. Processing continues to 418.

At 518, RQP receives notification at listener 2 of an update to table X, the notification including an AMDR message and a changed data snapshot when data has changed. Processing continues to 520.

At 520, RQP applies the changes to table X'. Processing continues to 522.

At 522, Client can propagate the AMDR changes to dependents of table X' to process changes through one or more DAGs of Client that include table X'. In some embodiments, Client uses a locking mechanism when performing 518, 520, 522, 524, and 526 to ensure that changes are applied to table X' and its dependents in a consistent manner, and to provide synchronization between such updates to table X' and plot redraws/updates (e.g., GUI redraws), as shown for example, in FIG. 9 of the '127 application.

It will be appreciated that, although not shown, the subscribing Client can cancel their subscription to stop receiving updates from RQP, and that the TDCP may cancel its own data subscriptions and/or discard data it no longer needs for any RQP. For example, Client can cancel its subscription to table X when the associated plot is no longer being displayed.

It will also be appreciated that 502-526 may be repeated in whole or in part. For example, 516-524/526 may be repeated to continue providing Client with consistent updates to table X so that Client can continue to update/redraw the plot.

FIGS. 6A-F show data source definitions, directed acyclic graphs (DAG), and a plotting object in accordance with some implementations. In FIG. 6A, example code 600 defines the data sources as tables (A, B, X, and Y). From the first four lines of code 600 for the data sources, DAG 602 can be generated as shown by the graph in FIG. 6B. DAG 602 in FIG. 6B shows dependencies between the nodes, which correspond to table data sources.

Although DAG 602 in FIG. 6B includes only four nodes, DAGs can be generated with more nodes in various configurations. For example, as shown in FIGS. 6A, 6B, 7, and 8 of the '127 application, also show data source definitions and a corresponding directed acyclic graph (DAG) in accordance with some implementations.

In FIG. 6A of the present disclosure, example code defines the data sources as tables (A, B, X, and Y), where A and B are a primary data sources. From the code for the data sources, a DAG can be generated as shown by the graph in FIG. 6B. DAG 602 in FIG. 6B shows dependencies between the nodes, which correspond to table relationships defined in FIG. 6A.

Data sources can include market data (e.g., data received via multicast distribution mechanism or through a tailer), system generated data, historical data, user input data from the remote user table server, tables programmatically generated in-memory, or something further upstream in the DAG. In general, anything represented in the data system as an object (e.g., a table) and which can refresh itself/provide data can be a data source. Also, data sources can include non-table data structures which update, for example, mathematical data structures. For example, B=A.sumBy("Group-Col"), where this creates a summation aggregation of table A as a new table B. The table B would then get updated when A changes as described, for example, in the '127 application. Similarly, minimum, maximum, variance, average, standard deviation, first, last, by, etc. aggregations can be supported, such as, for example, t5=t4.stdBy("GroupCol"), where this creates a standard deviation aggregation of table t4 as a new table t5.

In some implementations, code can be converted into the in-memory data structures holding the DAG. For example, the source code of FIG. 6A gets converted into the DAG data structure in memory. The DAG connectivity can change by executing code. For example, assume a set of code CODE1 is executed. CODE1 leads to a DAG1 being created. Data can be processed through DAG1, leading to table updates. Now assume that the user wants to compute a few more tables. The user can run a few more lines of code CODE2, which use variables computed in CODE1. The execution of CODE2 leads to a change in the DAG. As a simple example, assume that the first 3 lines in FIG. 6A are executed. The user could come along later and execute line 4, which would modify the DAG data structure (i.e., adding Y). Also, some implementations can permit other programs to listen to changes from a node representing a data object (e.g., table or non-table object). For example, such programs could include a plotting backend and could listen to changes from a node representing data used by the program and the plotting backend to generate a plot as well as update the plot as changes are processed through the DAG.

In some implementations, when a table changes, an application programming interface (API) can specify, for example, rows where add, modify, delete, or reindex (AMDR) changes were made. A reindex is a change in which a row is moved but the value contained in the row is not modified. The API can also provide a mechanism to obtain a value prior to the most recent change. When the DAG is processed during the refresh, the AMDR info on "upstream" data objects (e.g., tables, etc.) or nodes can be used to compute changes in "downstream" data objects or nodes. In some implementations, the entire DAG can be processed during the refresh cycle.

In general, a DAG can be comprised of a) dynamic nodes (DN); b) static nodes (SN); and c) internal nodes (IN) that can include nodes with DN and/or SN and/or IN as inputs.

DNs are nodes of the graph that can change. For example, DN can be data sources that update as new data comes in. DN could also be timers that trigger an event based on time intervals. In other examples, DN could also be MySQL monitors, specialized filtering criteria (e.g., update a "where" filter only when a certain event happens). Because these nodes are "sources", they may occur as root nodes in the DAG. At the most fundamental level, DN are root DAG nodes which change (e.g., are "alive").

SNs are nodes of the DAG that do not change. For example, historical data does not change. IN are interior nodes of the DAG. The state of an IN can be defined by its inputs, which can be DN, SN, and or IN. If all of the IN inputs are "static", the IN will be static. If one or more of the IN inputs is "dynamic", the IN will be dynamic. IN can be tables or other data structures. For example, a "listener IN" can permit code to listen to a node of the DAG. A listener node or associated listener monitoring code can place (or "fire") additional events (or notifications) into a priority queue of a DAG.

In general, a DAG can be composed of static and/or dynamic subgraphs. In some implementations, update processing occurs on dynamic subgraphs (because static subgraphs are not changing). In some such implementations, only dynamic nodes are in the DataMonitor loop. For Tables, change notification messages such as, for example, AMDR messages can be used for communication within the DAG.

When query code is executed, the DAG is created or modified. As part of this process, the system records the order in which the DAG nodes were constructed in. This "construction ordering" can be used to determine the order that nodes are processed in the DAG.

For example, consider:
a=db.i( . . . ), where a is a dynamic node (or DN)
b=a.where("A=1")
c=b.where("B=2")
d=c.join(b)

Assume (a) has changes to be processed during a refresh cycle. The order of processing will be (a), (b), (c), and then (d).

When (d) is processed, it will process input changes from both (b) and (c) before creating AMDRs notification messages for (d). This ordering prevents (d) from creating more than one set of AMDRs per input change, and it can help ensure that all AMDRs are consistent with all data being processed for the clock cycle. If this ordering were not in place, it may be possible to get multiple ticks per cycle and some of the data can be inconsistent. Also, the ordering can help ensure that joins produce consistent results.

In some examples, a single data source is used more than once (i.e., has two or more child nodes in the DAG).

It will be appreciated that the implementations discussed above can use any update message format and are not limited to AMDR messages.

In some implementations, refresh processing of a DAG such as those shown in FIGS. 6B-6D can be performed generally as disclosed in the '127 application.

FIGS. 6C-6E are diagrams illustrating how DAG 602 is modified as lines 5-8 of code 600 in FIG. 6A are processed. Lines 5-8 of code 600 include plot( ) commands to create a chart (or graph) (or plot) with three different series (and stored as the variable "myPlot"). Each of lines 5-8 adds a different series to the chart, the fifth line adding a first series based on columns "Col1" and "Col2" of table X, the sixth line adding a second series based on columns "Col1" and "Col3" of table X, and the seventh line adding a third series based on columns "Col1" and "Col2" of table Y.

As discussed above, DAG 602 can be generated from the first four lines of code 600. When the fifth line of code 600 is processed, DAG 602 is modified to include a preemptive table (X_export) that includes only the columns from table X that the fifth line of code specifies to be used by the plot( ) command (columns "Col1" and "Col2"), as shown by DAG 604 in FIG. 6C. When the sixth line of code 600 is processed, DAG 604 is modified such that preemptive table X_export includes only the columns from table X that the fifth and sixth lines of code specified to be used by the plot( ) command (columns "Col1", "Col2", "Col3"), as shown by DAG 606 in FIG. 6D. When the seventh line of code 600 is processed, DAG 606 is modified to include a preemptive table (Y_export) that includes only the columns from table Y that the seventh line of code specifies to be used by the plot( ) command (columns "Col1" and "Col2"), as shown by DAG 608 in FIG. 6E. In some embodiments, the "_export" table handles are not added to DAG 602 until after the "show( )" command in the last line is processed (this improves efficiency because the system can generate only the final preemptive table instead of all of the incremental preemptive tables needed to construct the final summary).

In some embodiments, export table handles such as X_export support the full suite of table operations, but execute everything except subscription requests via operating on the table being exported (e.g., table X) to create a new result table Z (not shown), and then on table Z to create a new subscription table Z_export (not shown). X_export additionally maintains state to keep track of pending index changes and snapshot delivery for all subscribed/subscribing clients (query processors and/or end user clients), batched up where subscription overlap permits, as shown by X_export in FIG. 6D where the columns of table X specified by the fifth and sixth lines of code 600 are batched together in X_export.

FIG. 6E is a diagram illustrating a DAG 608 connected through a RQP 680 and a Client 682, in accordance with some implementations. RQP 680 comprises DAG 608 and Client 682 comprises local copies or replicas of the X_export and Y_export tables of RQP's DAG 608. Although not shown, client 682 can be coupled to one or more human input devices (e.g. a display device) to display a graphical user interface (GUI) and receive input from a user. In operation, Client transmits data to and receives data from RQP to efficiently distribute plotting processing and efficiently synchronize plotting data to receive consistent updates to plotting data generated by RQP in accordance with the methods shown, for example, in FIGS. 4, 5, and 9, and described herein.

For example, after RQP 680 receives code 600 from client 682, exported table handles (with listeners) are added to the DAG as dependents of tables X and Y (shown as "X_export" and "Y_export" in FIG. 6E). The last line of code 600 can cause RQP 680 to transmit a plotting data structure such as plotting object 650 shown in FIG. 6F to client 682. Plotting object 650 includes a list 652 that contains export table handles 662, 664, and 666 for the three plots 656, 658, and 660, respectively, defined by lines 5, 6, and 7 of code 600, respectively. For example, export table handle 662 provides a reference to columns "Col1" and "Col2" of X_export, export table handle 664 provides a reference to columns "Col1" and "Col3" of X_export, and export table handle 666 provides a reference to columns "Col1" and "Col2" of Y_export. In some embodiments, client 682 can use the export table handles 662, 664, 666 to transmit a subscription request to RQP 680 to receive consistent updates as described in the '127 application. Alternatively, in some embodiments the subscription can be automatically applied by RQP 680 without waiting for client 682 to submit such a subscription request, as discussed herein.

In some embodiments, a replica table such as table X' is strictly in-memory table—it keeps a full copy of the remote table X_export's index, and all snapshot data that it's currently subscribed to in sparse array-backed column sources, with redirection indexes to allow compaction and efficient changes.

In some embodiments, X' and X'_2 of FIG. 6E are implemented as a single table. In some embodiments, a single preemptive table with view operations can be used to create X' and X'_2.

FIGS. 7A-7C show plotting code 700 including data source definitions, a directed acyclic graph (DAG), and a plotting object 750 in accordance with some implementations. Code 700 is similar to code 600, with a point size plotting attribute added to each of the plots at lines 5-8 of code 700. Plotting attributes such as point size can be added to plots and can defined by reference to one or more columns of an object such as a table. For example, in FIG. 7A the point size of each plot is being defined by the "SizeCol" columns of tables X and Y. FIG. 7B shows that code 700 results in X_export and Y_export each including the "SizeCol" column. Plotting object 750 is similar to plotting object 650 shown in FIG. 6F, with plot attributes 754 added. Plot attributes 754 includes a point size setting for each of the three plots defined by code 700. For the first plot (or "plot 0"), point size setting 768 is defined by table handle 744 which references the "SizeCol" column of X_export. For the second plot (or "plot 1"), point size setting 770 is set to table handle 776 which references the "SizeCol" column of X_export. For the third plot (or "plot 1"), point size setting 772 is set to table handle 778 which references the "SizeCol" column of Y_export.

Although not shown, additional plotting attributes can also be set such as, for example: type of chart (e.g., bar charts, line charts, scatter plots, etc.), data point appearance (e.g., point shape, line color, line thickness, point size, etc), various text (e.g., axis labels, chart titles, tool tip displayed, axis ticks, etc.), chart appearance (e.g., whether grid lines are displayed, what colors are used, etc.). The plotting attributes can be set individually based on data in an object (e.g., table columns as shown in FIGS. 7A-C or arrays (e.g., "plot( . . . ).pointSize([1, 2, 3] as int[ ])") to set the point size of individual points) or as a default using other values such as numeric values (e.g., "plot( . . . ).pointSize(2)" to double the default size of a point). In another example, formatted tooltips can be specified for data points by providing a formatting string (e.g., to show only a specific number of decimal places, to format a number as currency (e.g., adding a dollar sign), to format a number as a percent, to display a number in scientific notation, etc.), and the format string can be applied against a specified object (e.g., table column or array). Plotting attributes can also be set by applying a function to data (e.g., data from the table).

FIGS. 8A-8C show plotting code 800 and graphical user interfaces (GUIs) 870 and 872 in accordance with some implementations. The first line of code 800 sources the data for six different "USyms" on Aug. 21, 2017. The second line of code 800 applies the "oneClick( )" method to the table "t"; specifies the column "USym" should be enabled for OneClick filtering; and saves the OneClick SelectableDataSet to the variable "toc". The third line of the query creates a plot using data from the variable "toc"; and saves the plot to the variable "RetailPlot". Data in the "Timestamp" column is used for the plot's X-axis values and data from the Last column is used for the plot's Y-axis values.

As shown in FIG. 8B, GUI 870 includes inactive tabs 840 and an active tab 802 that includes a single-input filter 804 set to filter on the "USym" column 808 and a graph area 806 displaying the plot saved to the "RetailPlot" variable. In operation, after an appropriate "USym" value 810 is entered into single-input filter 804, a plot 812 for that "USym" value is displayed. After the "USym" value 850 is changed, a client computer (not shown) executing GUIs 870/872 transmits the new value 850 to the RQP processing the "RetailPlot" plot and then the RQP provides a new exported table handle to be used as the active table handle for the "RetailPlot"; and the client computer updates GUI 872 to display the new plot 852, in accordance with the methods disclosed herein such as, for example method 900 of FIG. 9.

Figure 9:
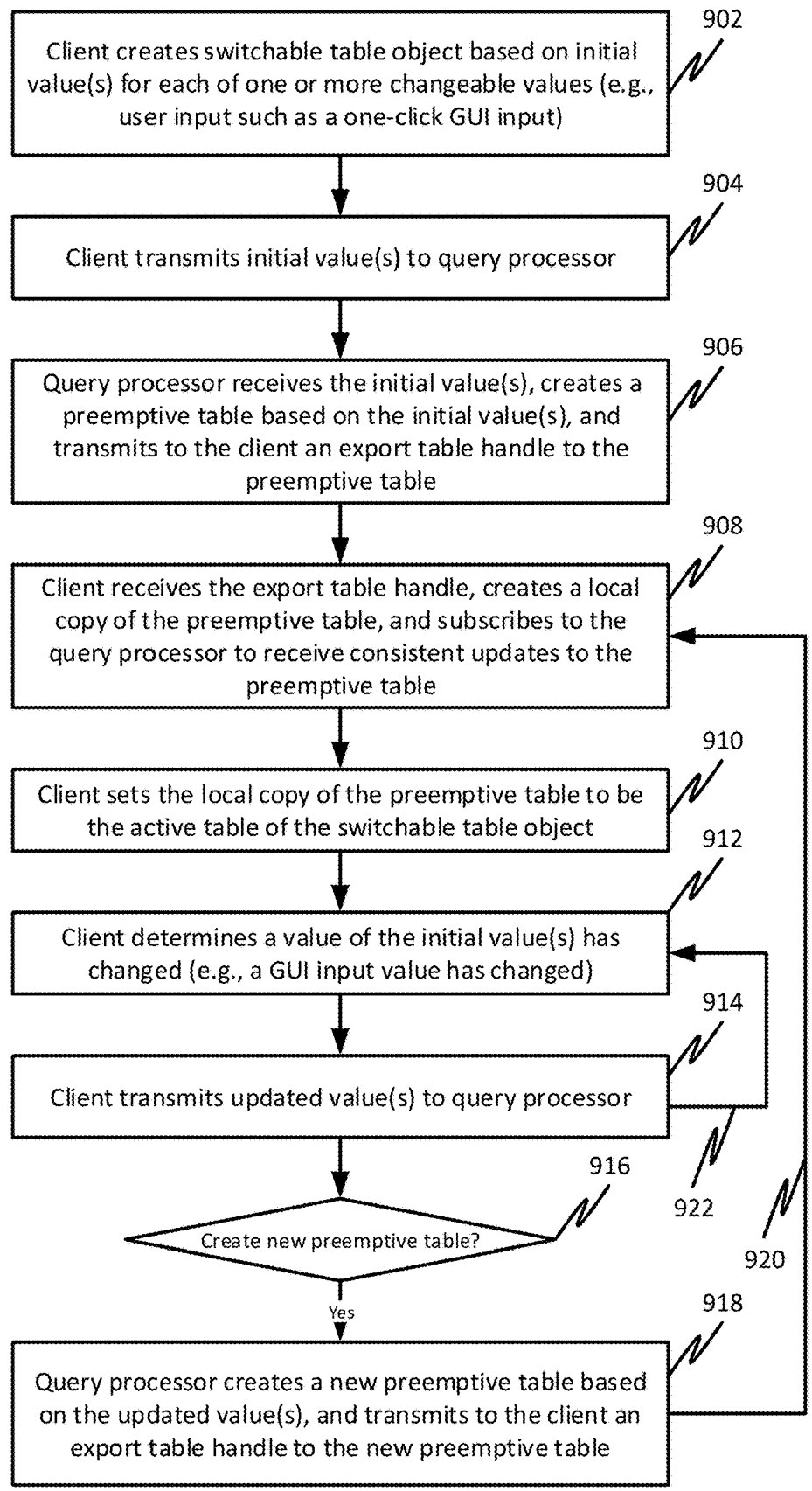
FIG. 9 is a flowchart of an example method of efficient distribution and synchronization of processing and data in accordance with some implementations.

FIG. 9 is a flowchart of an example method 900 of efficient distribution and synchronization of processing and data in accordance with some implementations. Processing begins at 902, where a Client creates a switchable table object based on initial value(s) for each of one or more changeable values (e.g., user input such as a one-click GUI input). In some embodiments the changeable values can be a user specified number of random samples to downsample data (downsampling data with random samples allows for faster plotting on clients and can support clients with limited memory and/or limited bandwith) (in such embodiments the randomly selected samples can be changed by getting a new export table handle to a new preemptive table). Processing continues to 904.

At 904, the client transmits initial value(s) to query processor. Processing continues to 906.

At 906, the query processor receives the initial value(s), creates a preemptive table based on the initial value(s), and transmits to the client an export table handle to the preemptive table. Processing continues to 908.

At 908, the client receives the export table handle, creates a local copy of the preemptive table, and subscribes to the query processor to receive consistent updates to the preemptive table. Processing continues to 910.

At 910, the client sets the local copy of the preemptive table to be the active table of the switchable table object. Processing continues to 912.

At 912, the client determines a value of the initial value(s) has changed (e.g., a GUI input value has changed). Processing continues to 914.

At 914, the client transmits updated value(s) to query processor. Processing continues to 916.

At 916, the query processor creates a new preemptive table based on the updated value(s), and transmits to the client an export table handle to the new preemptive table. Processing continues to 918.

It will be appreciated that 902-908 may be repeated in whole or in part, examples of which are shown as lines 920 and 922. For example, 908-918 may be repeated to switch the active table of the switchable table object based on changes to the initial value(s) (e.g., switching out the active table when a user modifies GUI input fields such as a one-click GUI input).

Figures 10A, 10B, 10C:
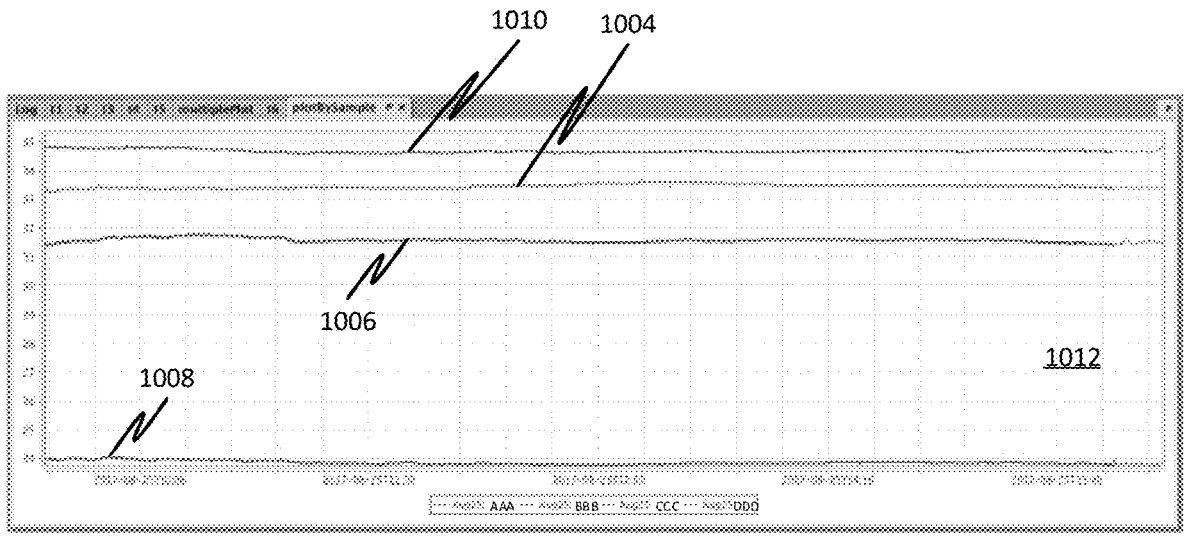
FIGS. 10A-10C show code using multiple plot methods within the same query to produce a chart with multiple series, code using a more efficient optimized method to create the same chart as code with greater efficiency.

FIGS. 10A-10C show code 1000 using multiple plot methods within the same query to produce a chart with multiple series, code 1002 using a more efficient optimized method to create the same chart 1012 as code 1000 with greater efficiency, in accordance with some implementations.

In code 1000, four individual plot methods are required to generate the plot. Code 1002 uses the "plotBy( )" method to create the same chart created in code 1000, but with greater efficiency. In code 1002, only one table ("t6") is generated by filtering the source table to contain information about all four USyms. Then, the "plotBy( )" method uses "USym" (the last argument) as the grouping column, which enables the plot to show data for the four USyms in the table, as shown as 1004, 1006, 1008, and 1010 of chart 1012 in FIG. 10C.

The "plotBy" group of methods can include "plotBy( )", "catPlotBy( )", and "ohlcPlotBy( )" and these methods can follow the same general syntax as their respective plotting methods with an additional argument to specify the grouping column to be used to plot multiple series. This greatly simplifies and shortens the query structure, improves efficiency, and enables plots that can adapt to the addition or removal of new groups. For example, if the second line of code 1002 were omitted, the "ployBySample" plot can adapt to the addition or removal of new groups.

An XY Series Chart can be used to show values over a continuum, such as time. XY Series can be represented as a line, a bar, an area or as a collection of points. The X axis can be used to show the domain, while the Y axis can show the related values at specific points in the range. The syntax for this method can be: plot("SeriesName", source, "xCol", "yCol"), where "SeriesName" is the name (as a string) you want to use to identify the series on the chart itself, source is the table that holds the data you want to plot, "xCol" is the name of the column of data to be used for the X value, "yCol" is the name of the column of data to be used for the Y value. The "plotBy" version of this method can have the following syntax: plot("SeriesName", source, "xCol", "yCol", "groupByCol"), where "groupByCol" enables users to specify the grouping column(s) to be used to plot multiple series (there can be more than one grouping column in which case an additional argument is added for each additional grouping column (e.g., "'State', 'City'")).

Category charts display the values of data from different discrete categories. By default, values can be presented as vertical bars. However, the chart can be presented as a bar, a stacked bar, a line, an area or a stacked area. The syntax for this method can be: catPlot("SeriesName", source, "CategoryCol", "ValueCol"), where "SeriesName" is the name (string) you want to use to identify the series on the chart itself, source is the table that holds the data you want to plot, "CategoryCol" is the name of the column (as a string) to be used for the categories, and "ValueCol" is the name of the column (as a string) to be used for the values. The "plotBy" version of this method can have the following syntax: catPlotBy("SeriesName", source, "CategoryCol", "ValueCol", "groupByCol"), where "groupByCol" enables users to specify the grouping column(s) to be used to plot multiple series (there can be more than one grouping column in which case an additional argument is added for each additional grouping column (e.g., "'State', 'City'")).

The Open, High, Low and Close (OHLC) chart typically shows four prices of a security or commodity per time slice: the open and close of the time slice, and the highest and lowest values reached during the time slice. This charting method can use a dataset that includes one column containing the values for the X axis (time), and one column for each of the corresponding four values (open, high, low, close) and has the following syntax: ohlcPlot("SeriesName", source, "Time", "Open", "High", "Low", "Close"), where "SeriesName" is the name (as a string) you want to use to identify the series on the chart itself, source is the table that holds the data you want to plot, "Time" is the name (as a string) of the column to be used for the X axis, "Open" is the name of the column (as a string) holding the opening price, "High" is the name of the column (as a string) holding the highest price, and "Low" is the name of the column (as a string) holding the lowest price, "Close" is the name of the column (as a string) holding the closing price. The "plotBy" version of this method can have the following syntax: ohlcPlotBy("SeriesName", source, "Time", "Open", "High", "Low", "Close", "groupByCol"), where "groupByCol" enables users to specify the grouping column(s) to be used to plot multiple series (there can be more than one grouping column in which case an additional argument is added for each additional grouping column (e.g., "'State', 'City'")).

Although references have been made herein to tables and table data, it will be appreciated that the disclosed systems and methods can be applied with various computer data objects to, for example, provide flexible data routing and caching for such objects in accordance with the disclosed subject matter. For example, references herein to tables can include a collection of objects generally, and tables can include column types that are not limited to scalar values and can include complex types (e.g., objects).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), a graphics processing unit (e.g., GPGPU or GPU) or the like. The instructions can be compiled from source code instructions provided in accordance with a programming language such as Java, C, C++, C # .net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, GP, GPU, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for computer data distribution architecture connecting an update propagation graph through multiple remote query processors.

Application Ser. No. 15/813,127, entitled "COMPUTER DATA DISTRIBUTION ARCHITECTURE CONNECTING AN UPDATE PROPAGATION GRAPH THROUGH MULTIPLE REMOTE QUERY PROCESSORS" and filed in the United States Patent and Trademark Office on Nov. 14, 2017, is hereby incorporated by reference herein in its entirety as if fully set forth herein.

Application Ser. No. 15/813,112, entitled "COMPUTER DATA SYSTEM DATA SOURCE REFRESHING USING AN UPDATE PROPAGATION GRAPH HAVING A MERGED JOIN LISTENER" and filed in the United States Patent and Trademark Office on Nov. 14, 2017, is hereby incorporated by reference herein in its entirety as if fully set forth herein.

Application Ser. No. 15/813,142, entitled "COMPUTER DATA SYSTEM DATA SOURCE HAVING AN UPDATE PROPAGATION GRAPH WITH FEEDBACK CYCLICALITY" and filed in the United States Patent and Trademark Office on Nov. 14, 2017, is hereby incorporated by reference herein in its entirety as if fully set forth herein.

Application Ser. No. 15/813,119, entitled "KEYED ROW SELECTION" and filed in the United States Patent and Trademark Office on Nov. 14, 2017, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer database system comprising:
one or more processors;
computer readable storage coupled to the one or more processors, the computer readable storage having stored thereon instructions that, when executed by the one or more processors, cause the one or more processors to perform operations including:
receiving, at a remote query processor, a plot command to generate a plot at a client computer, the plot command referencing a first object, the first object being updatable by propagating updates through an update propagation graph associated with the first object;
generating, at the remote query processor, a plotting data structure comprising an export object handle referencing at least a portion of the first object;
transmitting, at the remote query processor, one or more messages to the client computer, the one or more messages comprising the plotting data structure and an initial snapshot of the first object;
automatically subscribing, at the remote query processor, the client computer to receive consistent updates to the first object;
receiving, at the client computer, the one or more messages comprising the plotting data structure and the initial snapshot from the remote query processor;
creating, at the client computer, a second object to represent a replica of the portion of the first object referenced by the export object handle;
storing, at the client computer, the initial snapshot as the replica of the portion of the first object referenced by the export object handle;
assigning, at the client computer, the replica as an input to a figure to be displayed in a graphical user interface;
generating, at the client computer, a graphical figure comprising the plot based on the plotting data structure and the replica of the portion of the first object referenced by the export object handle;
adding at the remote query processor a first listener to the update propagation graph as a dependent of the first object;
receiving, at the first listener, an update notification indicating an update to the first object;
sending, by the remote query processor, a notification to the client computer including an indication of the change to the first object and a copy of any changed data;
responsive to receiving the notification at the client computer, updating the replica of the portion of the first object referenced by the export object handle; and
updating, at the client computer, the graphical figure comprising the plot based on the plotting data structure and the updated replica of the portion of the first object referenced by the export object handle.

2. The system of claim 1, wherein the plotting data structure comprises the initial snapshot.

3. The system of claim 1, the operations further including:
receiving, at the client computer, a request for the graphical figure from a remote computer; and
transmitting, at the client computer, the graphical figure in an image format to the remote computer.

4. The system of claim 3, wherein the image format is selected from a group consisting of JPEG, GIF, PNG, SVG, and PDF.

5. The system of claim 1, wherein the updating the graphical figure is performed after at least a portion of the graphical figure is visible in the graphical user interface.

6. The system of claim 1, wherein the updating the graphical figure is throttled such that the updating is performed as part of a batch update.

7. The system of claim 1, wherein the plotting data structure comprises a second export object handle referencing a second object to define an attribute of the plot.

8. A method comprising:
receiving, at a remote query processor, a plot command to generate a plot at a client computer, the plot command referencing a first object, the first object being updatable by propagating updates through an update propagation graph associated with the first object;
generating, at the remote query processor, a plotting data structure comprising an export object handle referencing at least a portion of the first object;
transmitting, at the remote query processor, one or more messages to the client computer, the one or more messages comprising the plotting data structure and an initial snapshot of the first object;
receiving, at the client computer, the one or more messages comprising the plotting data structure and the initial snapshot from the remote query processor;
creating, at the client computer, a second object to represent a replica of the portion of the first object referenced by the export object handle;
storing the initial snapshot as the replica of the portion of the first object referenced by the export object handle;
assigning, at the client computer, the replica as an input to a figure to be displayed in a graphical user interface;
generating, at the client computer, a graphical figure comprising the plot based on the plotting data structure and the replica of the portion of the first object referenced by the export object handle;
adding at the remote query processor a first listener to the update propagation graph as a dependent of the first object;
receiving, at the first listener, an update notification indicating an update to the first object;
sending, by the remote query processor, a notification to the client computer including an indication of the change to the first object and a copy of any changed data;
responsive to receiving the notification at the client computer, updating the replica of the portion of the first object referenced by the export object handle; and
updating, at the client computer, the graphical figure comprising the plot based on the plotting data structure and the updated replica of the portion of the first object referenced by the export object handle.

9. The method of claim 8, wherein the plotting data structure comprises the initial snapshot.

10. The method of claim 8, the operations further including:
receiving, at the client computer, a request for the graphical figure from a remote computer; and
transmitting, at the client computer, the graphical figure in an image format to the remote computer in response to the request from the remote computer.

11. The method of claim 10, wherein the image format is selected from a group consisting of JPEG, GIF, PNG, SVG, and PDF.

12. The method of claim 8, wherein the updating the graphical figure is performed after at least a portion of the graphical figure is visible in the graphical user interface.

13. The method of claim 8, wherein the updating the graphical figure is throttled such that the updating is performed as part of a batch update.

14. The method of claim 8, wherein the plotting data structure comprises a second export object handle referencing a second object to define an attribute of the plot.

15. A nontransitory computer readable medium having stored thereon software instructions that, when executed by one or more processors, cause the one or more processors to perform operations including:
   receiving, at a remote query processor, a plot command to generate a plot at a client computer, the plot command referencing a first object, the first object being updatable by propagating updates through an update propagation graph associated with the first object;
   generating, at the remote query processor, a plotting data structure comprising an export object handle referencing at least a portion of the first object;
   transmitting, at the remote query processor, one or more messages to the client computer, the one or more messages comprising the plotting data structure and an initial snapshot of the first object;
   receiving, at the client computer, the one or more messages comprising the plotting data structure and the initial snapshot from the remote query processor;
   creating, at the client computer, a second object to represent a replica of the portion of the first object referenced by the export object handle;
   storing the initial snapshot as the replica of the portion of the first object referenced by the export object handle;
   assigning, at the client computer, the replica as an input to a figure to be displayed in a graphical user interface;
   generating, at the client computer, a graphical figure comprising the plot based on the plotting data structure and the replica of the portion of the first object referenced by the export object handle;
   adding at the remote query processor a first listener to the update propagation graph as a dependent of the first object;
   receiving, at the first listener, an update notification indicating an update to the first object;
   sending, by the remote query processor, a notification to the client computer including an indication of the change to the first object and a copy of any changed data;
   responsive to receiving the notification at the client computer, updating the replica of the portion of the first object referenced by the export object handle; and
   updating, at the client computer, the graphical figure comprising the plot based on the plotting data structure and the updated replica of the portion of the first object referenced by the export object handle.

16. The nontransitory computer readable medium of claim 15, wherein the plotting data structure comprises the initial snapshot.

17. The nontransitory computer readable medium of claim 15, the operations further including:
   receiving, at the client computer, a request for the graphical figure from a remote computer; and
   transmitting, at the client computer, the graphical figure in an image format to the remote computer in response to the request from the remote computer.

18. The nontransitory computer readable medium of claim 15, wherein the updating the graphical figure is performed only when at least a portion of the graphical figure is visible in the graphical user interface.

19. The nontransitory computer readable medium of claim 15, wherein the updating the graphical figure is throttled such that the updating is performed as part of a batch update.

20. The nontransitory computer readable medium of claim 15, wherein the plotting data structure comprises a second export object handle referencing a second object to define an attribute of the plot.

21. The nontransitory computer readable medium of claim 15, the operations further comprising automatically subscribing, at the remote query processor, the client computer to receive consistent updates to the first object.

22. The method of claim 8, the operations further comprising automatically subscribing, at the remote query processor, the client computer to receive consistent updates to the first object.

23. The system of claim 1, wherein the first object is a table and the export object handle is an export table handle.

24. The method of claim 8, wherein the first object is a table and the export object handle is an export table handle.

25. The nontransitory computer readable medium of claim 15, wherein the first object is a table and the export object handle is an export table handle.

26. The system of claim 1, wherein the operations further include:
   determining that the graphical figure is not being displayed by the client computer; and
   responsive to the determining that the graphical figure is not being displayed, setting a mode of the plot to a sleep mode.

27. The system of claim 26, wherein the sleep mode ignores or prevents redraw events for the plot.

28. The method of claim 8, further comprising:
   determining that the graphical figure is not being displayed by the client computer; and
   responsive to the determining that the graphical figure is not being displayed, setting a mode of the plot to a sleep mode.

29. The method of claim 28, wherein the sleep mode stops updates to the first object from being received.

30. The nontransitory computer readable medium of claim 15, the operations further comprising:
   determining that the graphical figure is not being displayed by the client computer; and
   responsive to the determining that the graphical figure is not being displayed, setting a mode of the plot to a sleep mode.

* * * * *